(12) United States Patent
Andri et al.

(10) Patent No.: US 9,526,084 B2
(45) Date of Patent: Dec. 20, 2016

(54) RETRIEVAL OF NETWORK COMMUNICATIONS BASED ON PROXIMITY SENSING

(71) Applicants: Michael J. Andri, Portland, OR (US); Matthew R. Kissinger, Harrisburg, PA (US)

(72) Inventors: Michael J. Andri, Portland, OR (US); Matthew R. Kissinger, Harrisburg, PA (US)

(*) Notice: Subject to any disclaimer, the term of this patent is extended or adjusted under 35 U.S.C. 154(b) by 0 days.

(21) Appl. No.: 14/726,568

(22) Filed: May 31, 2015

(65) Prior Publication Data
US 2016/0021638 A1 Jan. 21, 2016

Related U.S. Application Data

(63) Continuation of application No. 13/936,586, filed on Jul. 8, 2013, now Pat. No. 9,049,572, which is a continuation of application No. 13/077,273, filed on Mar. 31, 2011, now Pat. No. 8,483,665.

(51) Int. Cl.
| | |
|---|---|
| *H04B 17/00* | (2015.01) |
| *H04M 1/725* | (2006.01) |
| *H04M 3/42* | (2006.01) |
| *H04W 4/00* | (2009.01) |
| *H04W 68/00* | (2009.01) |
| *H04W 52/02* | (2009.01) |
| *H04M 19/04* | (2006.01) |
| *H04W 4/12* | (2009.01) |
| *H04L 12/58* | (2006.01) |
| *H04W 74/06* | (2009.01) |

(52) U.S. Cl.
CPC ............ *H04W 68/005* (2013.01); *H04L 51/24* (2013.01); *H04L 51/38* (2013.01); *H04M 1/72569* (2013.01); *H04M 19/04* (2013.01); *H04M 19/047* (2013.01); *H04M 19/048* (2013.01); *H04W 4/12* (2013.01); *H04W 52/0254* (2013.01); *H04W 74/06* (2013.01); *H04M 2250/12* (2013.01)

(58) Field of Classification Search
CPC ........... H04W 52/027; H04W 52/0245; H04W 76/028; H04W 48/16; H04W 4/02
USPC .................... 455/67.11, 404.1, 412.2, 432.3, 456.3,455/466, 557, 574
See application file for complete search history.

(56) References Cited

U.S. PATENT DOCUMENTS

| | | | | |
|---|---|---|---|---|
| 7,031,271 | B1 * | 4/2006 | LaRosa | H04B 1/70752 370/311 |
| 7,085,246 | B1 * | 8/2006 | LaRosa | H04B 1/70752 370/311 |

(Continued)

*Primary Examiner* — William D Cumming

(57) ABSTRACT

A mobile device periodically polls a network server via a communications network to obtain new communications addressed to a client account according to a polling schedule. The mobile device receives an indication of a threshold change of one or more of ambient light, temperature, or proximity of an object to the mobile device via an optical sensor of the mobile device, or an indication of motion of the mobile device via a motion sensor of the mobile device. The polling schedule is advanced responsive to the indication of the threshold change of ambient light, temperature, or proximity, or the indication of motion. The mobile device outputs a notification that new communications have been received by the mobile device from the network server.

19 Claims, 4 Drawing Sheets

(56) References Cited

U.S. PATENT DOCUMENTS

| | | | | |
|---|---|---|---|---|
| 8,897,741 B2* | 11/2014 | Johnson | ............... | H04W 4/02 370/331 |
| 8,897,742 B2* | 11/2014 | Johnson | ............... | H04W 4/02 370/331 |
| 8,923,806 B2* | 12/2014 | Johnson | ............... | H04W 4/02 370/331 |
| 9,014,658 B2* | 4/2015 | Johnson | ............... | H04W 4/02 455/404.1 |
| 9,014,672 B2* | 4/2015 | Lee | ............... | H04L 12/587 370/311 |
| 9,078,095 B2* | 7/2015 | Johnson | ............... | H04W 4/02 |
| 9,113,295 B2* | 8/2015 | Johnson | ............... | H04W 4/02 |
| 2002/0119804 A1* | 8/2002 | Gomes | ............... | G06Q 10/107 455/557 |
| 2004/0192411 A1* | 9/2004 | Shim | ............... | H04W 52/027 455/574 |
| 2004/0229659 A1* | 11/2004 | Boos | ............... | H04W 52/0245 455/574 |
| 2005/0003765 A1* | 1/2005 | Alfano | ............... | H04W 48/18 455/67.11 |
| 2005/0164703 A1* | 7/2005 | Huynh | ............... | G06Q 10/107 455/432.3 |
| 2006/0293031 A1* | 12/2006 | Clarke | ............... | H04L 12/587 455/412.2 |
| 2006/0293032 A1* | 12/2006 | Clarke | ............... | H04L 12/587 455/412.2 |
| 2007/0178888 A1* | 8/2007 | Alfano | ............... | H04W 76/028 455/414.1 |
| 2008/0085729 A1* | 4/2008 | Lira | ............... | H04L 12/5895 455/466 |
| 2008/0164973 A1* | 7/2008 | Mamaloukas | ...... | G07C 9/00309 340/5.7 |
| 2008/0198134 A1* | 8/2008 | Huang | ............... | G06F 1/3203 345/166 |
| 2008/0242269 A1* | 10/2008 | Lee | ............... | H04L 12/587 455/412.1 |
| 2009/0156205 A1* | 6/2009 | Rowitch | ............... | H04W 48/16 455/434 |
| 2010/0045429 A1* | 2/2010 | Mullet | ............... | G07C 9/00182 340/5.71 |
| 2011/0125856 A1* | 5/2011 | Chu | ............... | H04M 1/72552 709/206 |
| 2012/0253485 A1* | 10/2012 | Weast | ............... | G06F 1/163 700/91 |
| 2013/0106603 A1* | 5/2013 | Weast | ............... | G06F 1/163 340/539.11 |
| 2013/0106684 A1* | 5/2013 | Weast | ............... | G06F 19/3481 345/156 |
| 2013/0110264 A1* | 5/2013 | Weast | ............... | G06F 19/3481 700/91 |
| 2013/0337789 A1* | 12/2013 | Johnson | ............... | H04W 4/02 455/414.1 |
| 2013/0337836 A1* | 12/2013 | Johnson | ............... | H04W 4/02 455/456.2 |
| 2013/0337841 A1* | 12/2013 | Johnson | ............... | H04W 4/02 455/456.3 |
| 2013/0339185 A1* | 12/2013 | Johnson | ............... | H04W 4/02 705/26.8 |
| 2013/0339498 A1* | 12/2013 | Johnson | ............... | H04W 4/02 709/221 |
| 2014/0244009 A1* | 8/2014 | Mestas | ............... | A63B 24/0062 700/91 |
| 2014/0266731 A1* | 9/2014 | Malhotra | ............... | G06F 1/163 340/573.1 |
| 2014/0302877 A1* | 10/2014 | Johnson | ............... | H04W 4/02 455/456.3 |
| 2015/0319563 A1* | 11/2015 | Johnson | ............... | H04W 4/02 455/456.3 |

* cited by examiner

RETRIEVAL OF NETWORK COMMUNICATIONS BASED ON PROXIMITY SENSING

CROSS-REFERENCE TO RELATED APPLICATION

The present application is a continuation application that claims the benefit of and priority to U.S. application Ser. No. 13/936,586, to be issued as U.S. Pat. No. 9,049,572, titled SENSOR DRIVEN MESSAGE RETRIEVAL FOR MOBILE DEVICE, filed Jul. 8, 2013, which is a continuation application that claims the benefit of and priority to U.S. application Ser. No. 13/077,273, issued as U.S. Pat. No. 8,483,665, titled MOBILE DEVICE FEATURING SENSOR RESPONSIVE RE-NOTIFICATIONS, filed Mar. 31, 2011, the entire contents of each of these applications are incorporated herein by reference in their entirety for all purposes.

BACKGROUND

Mobile devices may notify their users of incoming calls, text messages, emails, calendar events, or alarms through visual, audible, or haptic indications. Mobile devices expend energy to notify users, and such notifications may frustrate users if the notifications are provided too frequently. Accordingly, the use of notifications should be limited. Yet, notifications that are provided too infrequently may cause users to examine or otherwise interact with their mobile devices too frequently to identify events that may have occurred, which may again expend energy of the mobile devices or frustrate users.

SUMMARY

Implementations for mobile device notifications are disclosed. In one implementation, a mobile device periodically polls a network server via a communications network to obtain new communications addressed to a client account according to a polling schedule. The mobile device receives an indication of a threshold change of one or more of ambient light, temperature, or proximity of an object to the mobile device via an optical sensor of the mobile device, or an indication of motion of the mobile device via a motion sensor of the mobile device. The polling schedule is advanced responsive to the indication of the threshold change of ambient light, temperature, or proximity, or the indication of motion. The mobile device outputs a notification that new communications have been received by the mobile device from the network server. Claimed subject matter, however, is not limited by this summary as other implementations may be disclosed by the following written description and associated drawings.

DETAILED DESCRIPTION

Figure 1:
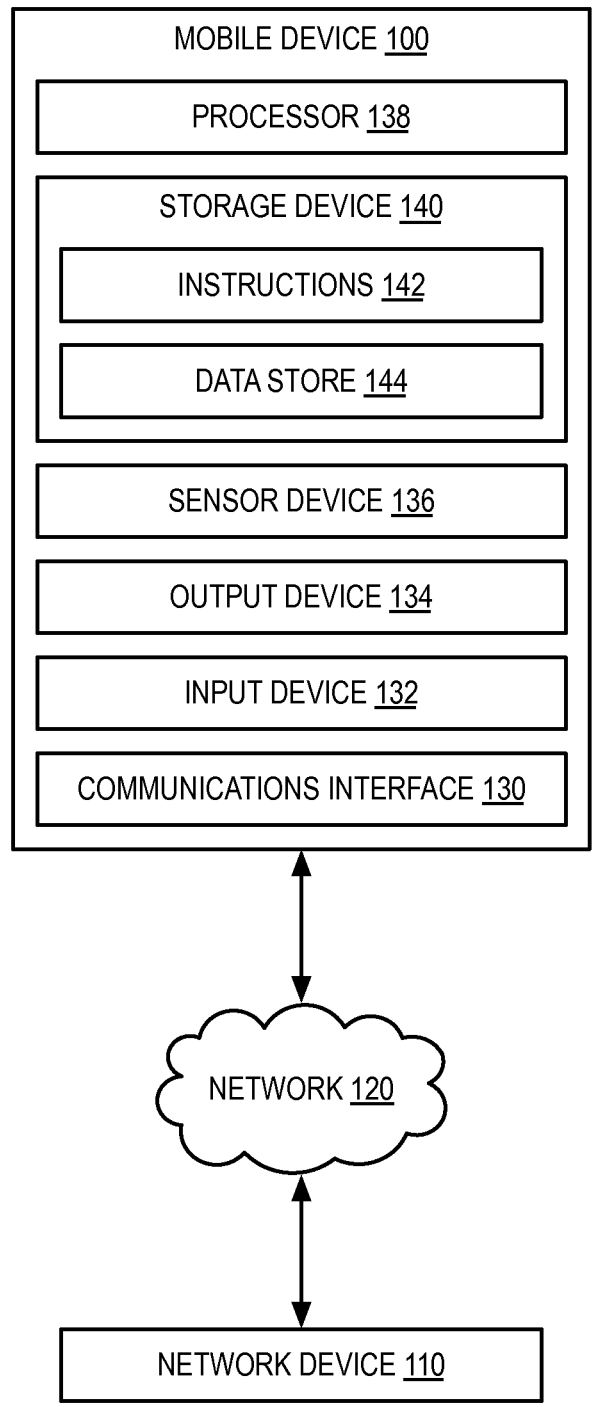
FIG. 1 is a schematic diagram depicting an example mobile device in a network environment according to one implementation.

FIG. 1 is a schematic diagram depicting an example mobile device 100 in a network environment according to one implementation. Mobile device 100 is depicted communicating with a network device 110 via a wireless communications network 120. Network device 110 may include a wireless base station, communications satellite, network server, or another mobile device, for example.

Mobile device 100 may include a communications interface 130 (e.g., wireless transceiver) to send or receive wireless communications via network 120. Mobile device 100 may include an input device 132 such as, for example, one or more of a touch-sensitive graphical display, keyboard, button, microphone, etc. to receive user input. Mobile device 100 may include an output device 34 such as, for example, one or more of a graphical display, light emitting element, audio speaker, haptic feedback module, etc. to output one or more of a visual indication, an audible indication, or a haptic indication. A haptic indication may refer to a vibration or motion generated by a haptic feedback module of the mobile device. Mobile device 100 may include a sensor device 136 including a motion sensor (e.g., inertial sensor or gyroscope) to detect motion of the mobile device or an optical sensor to detect a threshold change of ambient lighting or temperature, or a threshold change in proximity of an object to the mobile device that may be caused, for example, by user manipulation of the mobile device.

Mobile device 100 may include a control system including, for example, one or more processors 138, and a storage device 140 having or including computer readable instructions 142 stored thereon executable by one or more processors 138 to perform the example methods or operations described herein such as methods 200 and 600. As one example, the control system may be configured to output a first notification of an event via the one or more output devices responsive to occurrence of the event. The event may include occurrence of a calendar event, occurrence of an alarm event, or reception of a communications message via communications interface 130 of mobile device 100. The first notification may include one or more of a visual indication, an audible indication, or a haptic indication. The control system may be configured to discontinue the first notification after a first period of time, detect motion of the mobile device via the motion sensor after a second period of time after the first notification is discontinued, and output a second notification of the event via the one or more output devices after the second period of time after the first notification is discontinued responsive to detection of the motion of the mobile device. The second notification may provide a re-notification of the event. The second notification may include one or more of a visual indication, an audible indication, or a haptic indication. The control system enables notifications to be targeted to scenarios where a notification is likely to be effective at notifying the user, such as when the user is near the mobile device as indicated, for example, by motion of the mobile device, change in ambient lighting or temperature conditions, or change in proximity of an object to the mobile device.

In at least some implementations, the control system may be further configured to detect motion of the mobile device negating the second notification via the motion sensor beginning during the output of the first notification or beginning before expiration of a second period of time after the first notification is discontinued, and avoid output of the second notification responsive to detection of the motion of the mobile device negating the second notification.

In at least some implementations, the control system may be further configured to receive a user input negating the second notification via the input device during the output of the first notification or before expiration of the second period of time after the first notification is discontinued, and avoid output of the second notification responsive to detection of the motion of the mobile device negating the second notification.

In at least some implementations, the control system may be further configured to output the second notification if the motion of the mobile device is not detected via the motion sensor after a threshold period of time after discontinuing the first notification.

In at least some implementations, the detected motion of the mobile device includes a threshold level of motion or a characteristic motion of the mobile device. A characteristic motion may include, for example, a lifting of the mobile device from a resting position, a shaking of the mobile device, motion of the mobile device for a period of time and/or intensity, or other suitable characteristic motion. The control system may be further configured to output the second notification if the threshold level of motion of the mobile device or the characteristic motion of the mobile device is detected.

In at least some implementations, the mobile device may be configured to poll a network server via a communications network to obtain new communications addressed to a client account based on a polling schedule. As one example, the mobile device may poll the network server by sending a request to the network server (e.g., network device 110) via the communications network indicating a client account identifier. The network server may respond to the mobile device with one or more new communications received at the network server from one or more other clients that are addressed to the client account indicated by the request. The mobile device may receive the response including the one or more new communications. As previously described, the mobile device may output one or more notifications in response to receiving communications from the network server via the communications network. An example polling schedule may cause the mobile device to poll the network server at a predetermined frequency (e.g., every 15 minutes, every hour, etc.).

The mobile device may be configured to receive an indication of a threshold change of one or more of ambient light, temperature, or proximity of an object to the mobile device via an optical sensor of the mobile device, or an indication of motion of the mobile device via a motion sensor of the mobile device. As previously described, sensor device 136 of the mobile device may receive one or more indications of a change in a operating condition of the mobile device. The mobile device may be configured to advance the polling schedule responsive to the indication of the threshold change of ambient light, temperature, or proximity, or the indication of motion.

Storage device 140 may further include a data store 144 for storing user data, including user preference settings. In at least some implementations, a user may select whether a second notification is to be output by the mobile device, and may select or assign input parameters for initiating output of the second notification. The control system may output the second notification in accordance with the user preference settings in such implementations. Furthermore, it will be appreciated that third, fourth, fifth, etc. notifications may be output by the mobile device using similar approaches described with respect to the second notification. As another example, user preference settings may define the initial polling schedule described above, which may be advanced in response to an indication received at the mobile device.

Figure 2:
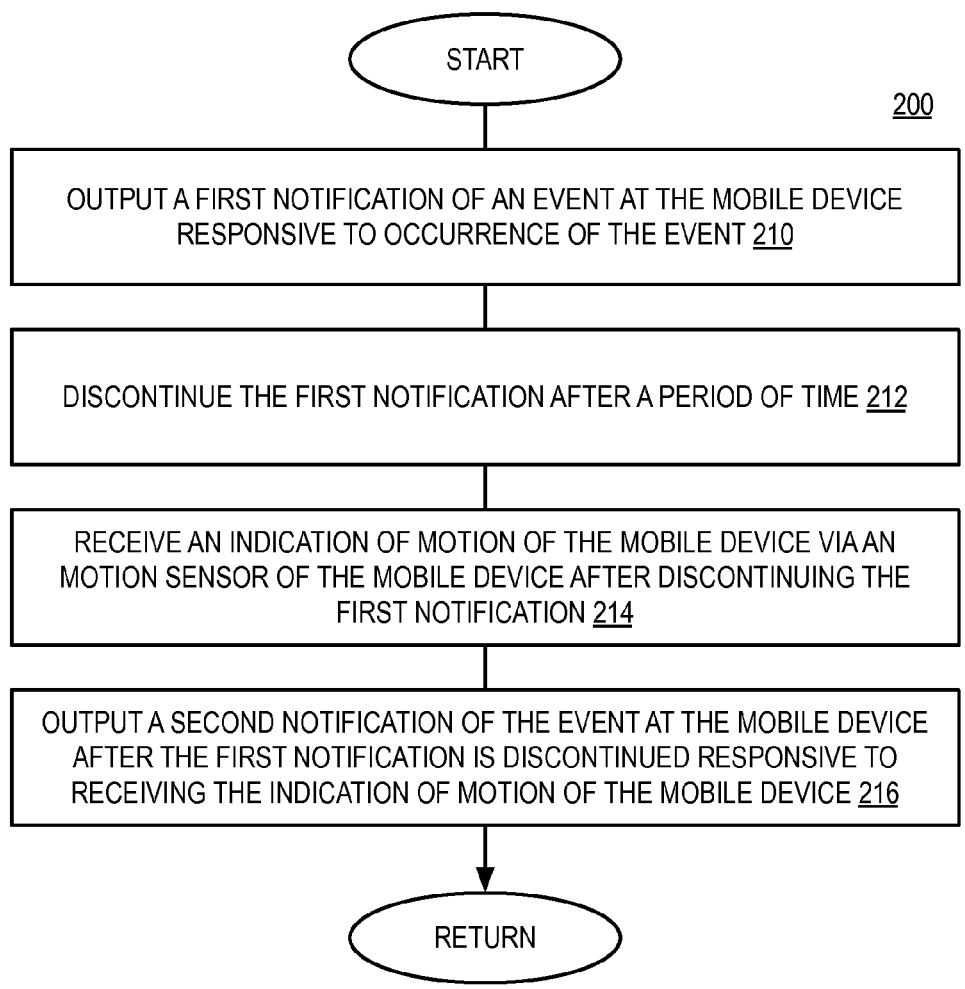
FIG. 2 is a flow diagram depicting an example method for a mobile device according to one implementation.

FIG. 2 is a flow diagram depicting an example method 200 for a mobile device according to one implementation. Method 200 may be implemented by previously described mobile device 100 of FIG. 1, for example. Method 200 enables notifications to be targeted to scenarios where a notification is likely to be effective for notifying the user, such as when the user is near the mobile device as indicated, for example, by motion of the mobile device, change in ambient lighting or temperature conditions, or change in proximity of an object to the mobile device.

At 210, the method includes outputting a first notification of an event at the mobile device responsive to occurrence of the event. At 212, the method includes discontinuing the first notification after a period of time. At 214, the method includes receiving an indication of motion of the mobile device via a motion sensor of the mobile device after discontinuing the first notification. At 216, the method includes outputting a second notification of the event at the mobile device after discontinuing the first notification responsive to receiving the indication of motion of the mobile device.

In at least some implementations, an event may include reception of a communication message, such as an incoming call, text message, or email, for example. For example, prior to the method at 210, the method may further include receiving a communication message at the mobile device via a wireless network, and outputting the first notification of the communication message at the mobile device at 210 responsive to receiving the communication message. An event may also include occurrence of a calendar event, an alarm event, or other suitable event that does not necessarily involve receiving a communication message. In at least some implementations, outputting the first notification at 210 and outputting the second notification at 212 may each include outputting one or more of a visual indication, an audible indication, or a haptic indication via one or more output devices of the mobile device. As one example, outputting the first notification and the second notification may include displaying a description or summary of the event via a graphical display of the mobile device.

Figure 4:
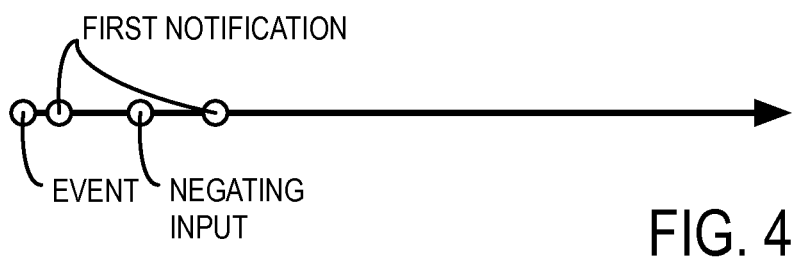
Figure 5:
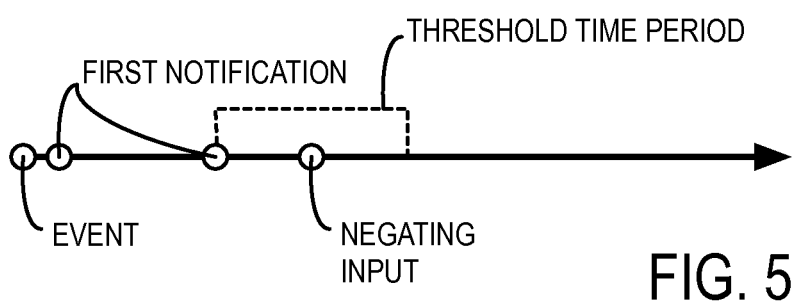

In at least some implementations, the method may further include receiving an indication of motion of the mobile device negating the second notification via the motion sensor of the mobile device during outputting the first notification and beginning before discontinuing the first notification, and avoiding outputting the second notification responsive to receiving the indication of motion of the mobile device negating the second notification. An example of this implementation is shown in FIG. 4. In such implementations, receiving the indication of motion of the mobile device after discontinuing the first notification at 214 may further include receiving the indication of motion of the mobile device after a threshold period of time after discontinuing the first notification. Outputting the second notification after discontinuing the first notification at 216 may further include outputting the second notification responsive to receiving the indication of motion of the mobile device after the threshold period of time after discontinuing the first notification. Receiving the indication of motion of the mobile device negating the second notification may further include receiving the indication of motion of the mobile device negating the second notification during outputting the first notification or beginning before the threshold period of time after discontinuing the first notification. An example of this implementation is shown in FIG. 5.

In at least some implementations, the method may further include receiving a user input negating the second notification via an input device of the mobile device during outputting the first notification, and avoiding outputting the second notification responsive to receiving the user input via the input device during outputting the first notification. An example of this implementation is shown in FIG. 4. In such implementations, receiving the indication of motion of the mobile device after discontinuing the first notification at 214 may further include receiving the indication of motion of the mobile device after a threshold period of time after discontinuing the first notification. Outputting the second notification after discontinuing the first notification at 216 may further include outputting the second notification responsive to receiving the indication of motion of the mobile device after the threshold period of time after discontinuing the first notification. Receiving the user input negating the second notification may further include receiving the user input negating the second notification during outputting the first notification or before the threshold period of time after discontinuing the first notification. An example of this implementation is shown in FIG. 5.

In at least some implementations, receiving the indication of motion of the mobile device at 214 may include receiving an indication of a threshold level of motion or a characteristic motion of the mobile device. Outputting the second notification at 216 may include outputting the second notification after discontinuing the first notification responsive to receiving the indication of the threshold level of motion of the mobile device or the characteristic motion of the mobile device. In such implementations, the method may further include receiving an indication of a threshold level of motion or a characteristic motion of the mobile device negating the second notification via the motion sensor of the mobile device during outputting the first notification and beginning before discontinuing the first notification, and avoiding outputting the second notification responsive to receiving the indication of the threshold level of motion or the characteristic motion of the mobile device negating the second notification.

Furthermore, in such implementations, receiving the indication of the threshold level of motion or the characteristic motion of the mobile device after discontinuing the first notification may further include receiving the indication of the threshold level of motion or the characteristic motion of the mobile device after a threshold period of time after discontinuing the first notification. Outputting the second notification after discontinuing the first notification may further include outputting the second notification responsive to receiving the indication of the threshold level of motion or characteristic motion of the mobile device after the threshold period of time after discontinuing the first notification. Receiving the indication of the threshold level of motion or the characteristic motion of the mobile device negating the second notification may further include receiving the indication of the threshold level of motion or the characteristic motion of the mobile device negating the second notification during outputting the first notification or beginning before the threshold period of time after discontinuing the first notification.

In at least some implementations, the method at 214 may alternatively or additionally include receiving an indication of a threshold change of ambient light or a threshold change in proximity of an object to the mobile device via an optical sensor of the mobile device after discontinuing the first notification. In such implementations, the method at 216 may alternatively or additionally include outputting the second notification after discontinuing the first notification responsive to receiving the indication of the threshold change of ambient light or the threshold change in proximity of the object to the mobile device.

In at least some implementations, the method may further include outputting the second notification if the indication of motion of the mobile device is not received via the motion sensor, a user input is not received via a user input device of the mobile device, or a threshold change of ambient light or a threshold change in proximity of an object to the mobile device via an optical sensor after a threshold period of time after discontinuing the first notification.

Figure 3:
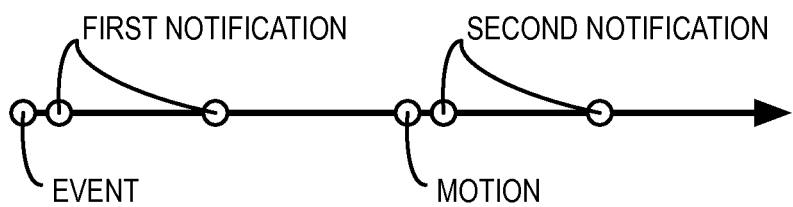
FIGS. 3-5 are timelines depicting example notifications for a mobile device.

FIGS. 3-5 are timelines depicting example notifications for a mobile device. FIGS. 3-5 each depict how a first notification may be output for a period of time in response to an event. In FIG. 3, a second notification may be output for a period of time in response to motion detected after the first notification is discontinued. In FIG. 4, a negating input is received during output of the first notification, which avoids output of the second notification. The negating input may include detected motion, a user input, or change in ambient lighting or temperature conditions, or change in a proximity of an object to the mobile device. In FIG. 5, a negating input is received after the output of the first notification is discontinued but within a threshold period of time after the output of the first notification is discontinued, which avoids output of the second notification.

Figure 6:
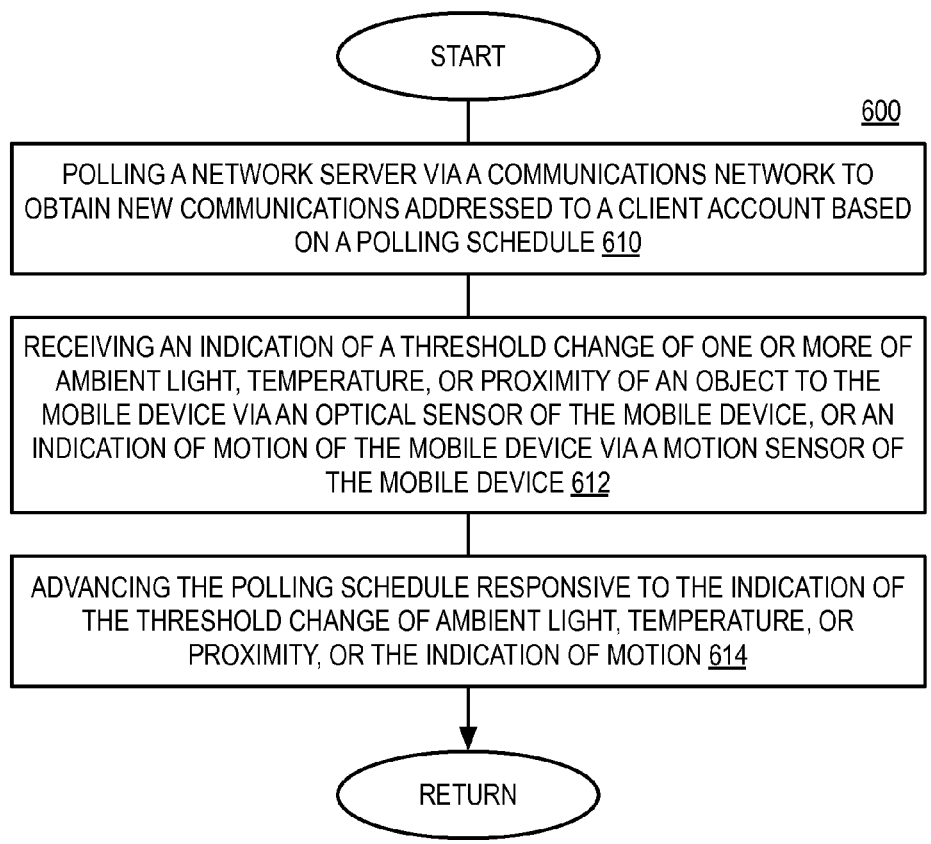
FIG. 6 is a flow diagram depicting an example method for a mobile device according to one implementation.

FIG. 6 is a flow diagram depicting an example method 600 for a mobile device according to one implementation. Method 600 may be implemented by previously described mobile device 100 of FIG. 1, for example.

At 610, the method includes polling a network server via a communications network to obtain new communications addressed to a client account based on a polling schedule. As one example, the mobile device may poll the network server by sending a request to the network server (e.g., network device 110) via the communications network indicating a client account identifier. The network server may respond to the mobile device with one or more new communications received at the network server from one or more other clients that are addressed to the client account indicated by the request. The mobile device may receive the response including the one or more new communications. As previously described, the mobile device may output one or more notifications in response to receiving communications from the network server via the communications network. An example polling schedule may cause the mobile device to poll the network server at a predetermined frequency (e.g., every 15 minutes, every hour, etc.).

At 612, the method includes receiving an indication of a threshold change of one or more of ambient light, temperature, or proximity of an object to the mobile device via an optical sensor of the mobile device, or an indication of motion of the mobile device via a motion sensor of the mobile device. As previously described, a sensor device of the mobile device may receive one or more indications of a change in a operating condition of the mobile device.

Figure 7:
FIGS. 7 and 8 are timelines depicting example polling schedules for a mobile device.
Figure 8:
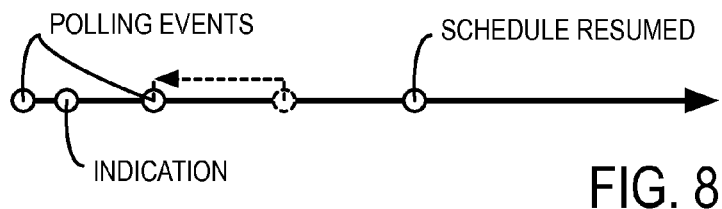

At 614, the method includes advancing the polling schedule responsive to the indication of the threshold change of ambient light, temperature, or proximity, or the indication of motion. For example, as illustrated by comparing the polling schedule of FIGS. 7 and 8, the polling event in FIG. 8 is advanced relative to FIG. 7 in response to receiving the indication at 612. FIG. 8 also depicts how the original polling schedule may be resumed after at least one polling event has been advanced.

It will be appreciated that method 600 may be combined with method 200 or portions thereof to enable one or more notifications to be output by the mobile device in response to receiving one or more new messages from the server device. It will also be appreciated that the indications received at 612 may be used to advance the polling schedule in combination with other events that may be used to advance the polling schedule such as a user turning on the mobile device, waking the mobile device from an idle state, opening a home screen of the mobile device, pressing a button or touch screen of the mobile device, or opening an application program of the mobile device, among other suitable events.

Throughout the written description and claims, the terms "first" and "second" have been used to refer to different elements, and should not be interpreted as necessarily requiring a particular order unless otherwise defined by the context. It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for a mobile device, comprising:
    polling a network server via a communications network to obtain new communications addressed to a client account based on a polling schedule;
    receiving an indication of a threshold change of proximity of an object to the mobile device via an optical sensor of the mobile device;
    advancing the polling schedule responsive to the indication of the threshold change of proximity;
    outputting a notification at the mobile device via one or more output devices as one or more of a visual indication, an audible indication, or a haptic indication responsive to obtaining the new communications addressed to the client account from the network server via the communications network;
    discontinuing output of the notification after a period of time;
    receiving a subsequent indication of a threshold change of proximity of an object to the mobile device via the optical sensor of the mobile device;
    outputting a subsequent notification at the mobile device via the one or more output devices after the notification is discontinued responsive to receiving the subsequent indication of the threshold change of proximity; and
    avoiding output of the subsequent notification responsive to receiving the subsequent indication during output of the notification and beginning before the notification is discontinued.

2. The method of claim 1, further comprising:
    avoiding output of the subsequent notification responsive to receiving the subsequent indication beginning within a threshold period of time after the notification is discontinued.

3. The method of claim 1, further comprising:
    resuming the polling schedule after at least one polling event has been advanced.

4. The method of claim 1, wherein the polling schedule defines how frequently the mobile device requests and receives new communications addressed to the client account; and
    wherein advancing the polling schedule includes the mobile device requesting the new communications from the network server upon obtaining the indication of the threshold change of proximity to temporarily increase the frequency of the polling schedule.

5. The method of claim 1, further comprising: advancing the polling schedule in time responsive to a user waking the mobile device from an idle state.

6. The method of claim 1, wherein the new communications include new email communications.

7. A mobile device, comprising:
    an optical sensor to detect proximity of objects to the mobile device;
    one or more output devices to output one or more of a visual indication, an audible indication, or a haptic indication; and
    a control system to:
        periodically poll a network server according to a polling schedule via a communications network to obtain new communications addressed to a client account;
        receive an indication of a threshold change in proximity of an object to the mobile device via the optical sensor;
        advance the polling schedule in time responsive to the indication of the threshold change in proximity
        output a notification at the mobile device via the one or more output devices as one or more of the visual indication, the audible indication, or the haptic indication responsive to obtaining the new communications addressed to the client account via the communications network;
        discontinue output of the notification after a period of time;
        receive a subsequent indication of a threshold change of proximity of an object to the mobile device via the optical sensor of the mobile device;
        output a subsequent notification at the mobile device via the one or more output devices after the notification is discontinued responsive to receiving the subsequent indication of the threshold change of proximity; and
        avoid output of the subsequent notification responsive to the subsequent indication being received during output of the notification and beginning before the notification is discontinued or within a threshold period of time after the notification is discontinued.

8. The mobile device of claim 7, further comprising:
    a motion sensor;
    wherein the control system is further to:
        receive an the indication of motion of the mobile device via the motion sensor; and
        advance the polling schedule in time responsive to the indication of motion of the mobile device.

9. The mobile device of claim 7, wherein the control system is further to:
    resume the polling schedule after at least one polling event has been advanced.

10. The mobile device of claim 7, wherein the control system is further to:
    advance the polling schedule in time responsive to a user waking the mobile device from an idle state.

11. The mobile device of claim 7, wherein the control system includes:
  one or more processors; and
  a storage device having or including computer readable instructions stored thereon executable by the one or more processors.

12. The method of claim 1, wherein the subsequent notification is output via the one or more output devices as one or more of a visual indication, an audible indication, or a haptic indication.

13. The mobile device of claim 7, wherein the subsequent notification is output via the one or more output devices as one or more of a visual indication, an audible indication, or a haptic indication.

14. A method for a mobile device, comprising:
  polling a network server via a communications network to obtain new communications addressed to a client account based on a polling schedule;
  receiving an indication of a threshold change of proximity of an object to the mobile device via an optical sensor of the mobile device;
  advancing the polling schedule responsive to the indication of the threshold change of proximity;
  outputting a notification at the mobile device via one or more output devices as one or more of a visual indication, an audible indication, or a haptic indication responsive to obtaining the new communications addressed to the client account from the network server via the communications network;
  discontinuing output of the notification after a period of time;
  receiving a subsequent indication of a threshold change of proximity of an object to the mobile device via the optical sensor of the mobile device;
  outputting a subsequent notification at the mobile device via the one or more output devices after the notification is discontinued responsive to receiving the subsequent indication of the threshold change of proximity; and
  avoiding output of the subsequent notification responsive to receiving the subsequent indication beginning within a threshold period of time after the notification is discontinued.

15. The method of claim 14, wherein the subsequent notification is output via the one or more output devices as one or more of a visual indication, an audible indication, or a haptic indication.

16. The method of claim 14, further comprising:
  resuming the polling schedule after at least one polling event has been advanced.

17. The method of claim 14, wherein the polling schedule defines how frequently the mobile device requests and receives new communications addressed to the client account; and
  wherein advancing the polling schedule includes the mobile device requesting the new communications from the network server upon obtaining the indication of the threshold change of proximity to temporarily increase the frequency of the polling schedule.

18. The method of claim 1, further comprising: advancing the polling schedule in time responsive to a user waking the mobile device from an idle state.

19. The method of claim 1, wherein the new communications include new email communications.

* * * * *